May 16, 1933.  F. J. NEMMERS  1,909,416
TARGET TRAP CONTROL MECHANISM
Filed July 29, 1932
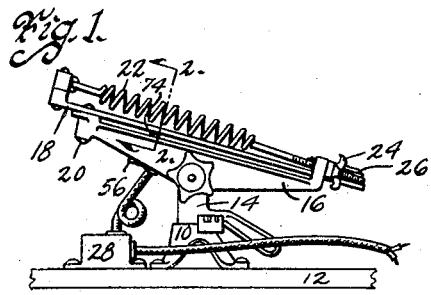
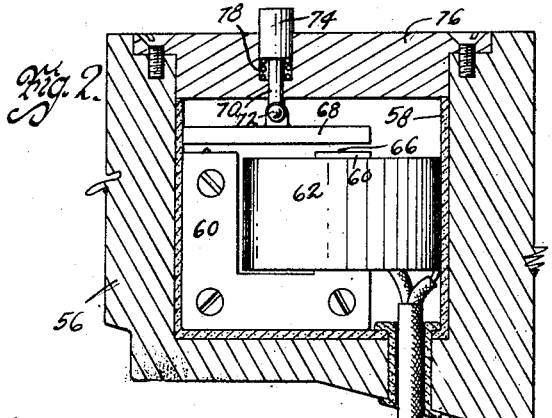
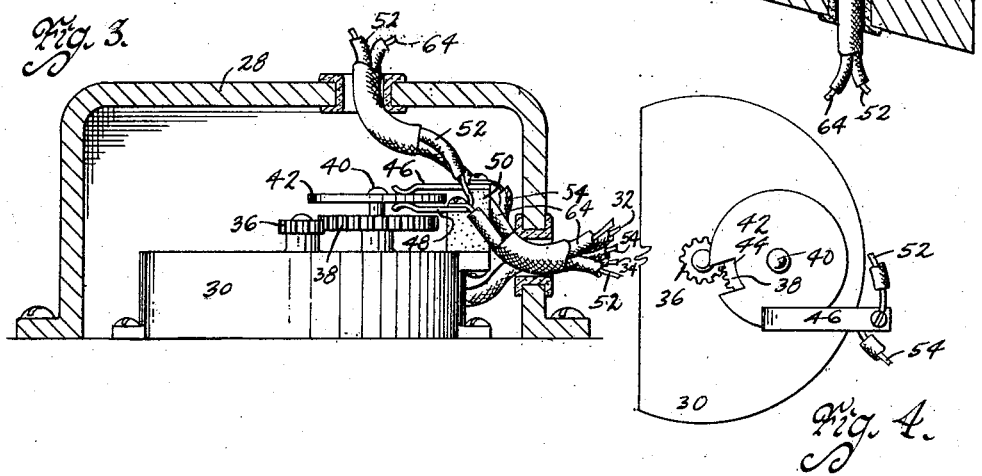
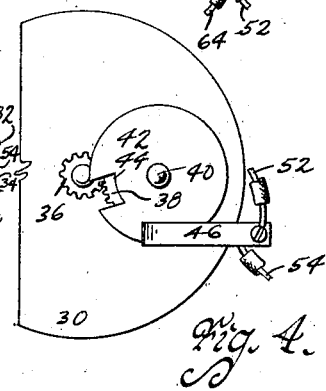
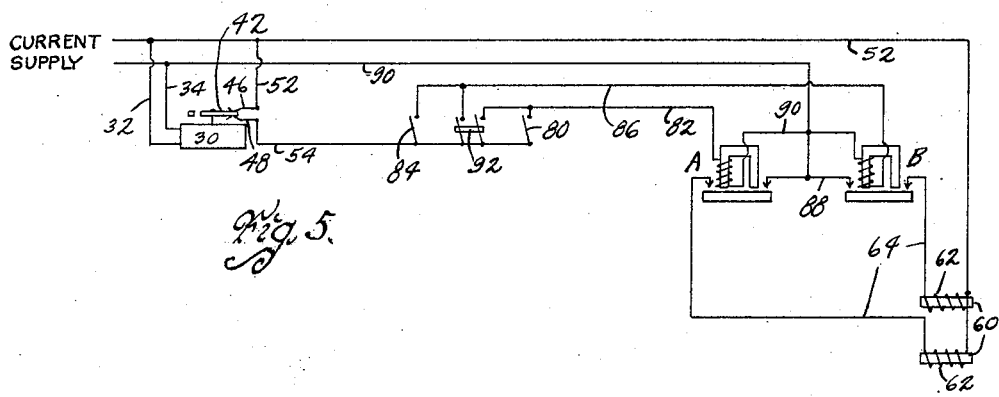
Inventor
Francis J. Nemmers
By Bair, Freeman & Sinclair
Attorneys
Witness
Edw. Seeley Patented May 16, 1933

1,909,416

UNITED STATES PATENT OFFICE

FRANCIS J. NEMMERS, OF LE MARS, IOWA, ASSIGNOR OF ONE-FOURTH TO RALPH E. RIPPEY AND ONE-FOURTH TO ROBERT M. ST. CLAIR, BOTH OF LE MARS, IOWA

TARGET TRAP CONTROL MECHANISM

Application filed July 29, 1932. Serial No. 625,847.

The object of this invention is to provide an improved electrical control mechanism for releasing the throwing arm of a target trap employed for trap shooting and the like.

A further object of the invention is to provide an improved target trap control mechanism including electrical devices for releasing the throwing arm of the trap at a variable length of time after the manual closing of a switch in the control circuit.

Still another object of the invention is to provide an improved mechanism for controlling the release of a target trap in such manner as to involve the element of surprise, through a variable period of delay, as to the exact time when the target will be thrown.

More specifically an object of the invention is to provide improved electrical control mechanism for target traps including a manual switch for the control circuit, the circuit including a pair of contact members which are normally spaced apart by a movable insulating member which at one point is provided with an opening permitting engagement of said contact members, whereby the circuit is closed for releasing the trap mechanism at a variable period subsequent to the manual closing of the main circuit switch.

Still another object is to provide an improved mechanism including controls for a plurality of traps, the controls being so arranged that either trap may be released at a given time or both traps may be simultaneously released through selective operation of manual switch elements.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:—

Figure 1 is a side elevation illustrating a conventional type of target trap equipped with my improved control mechanism.

Figure 2 is an enlarged section illustrating particularly the magnet for releasing the throwing arm of the trap when the circuit is closed through said magnet, said view being taken substantially on the line 2—2 of Figure 1.

Figure 3 is a vertical section through the control box which houses a part of the operating mechanism involved in my invention.

Figure 4 is a plan view of portions of the mechanism shown in Figure 3.

Figure 5 is a diagram of the electrical connections employed in connection with my control mechanism.

This invention relates to control mechanism for target traps of the kind employed for projecting clay pigeons for trap shooting. More particularly, the invention involves the delayed closing, for a variable period, of a circuit whereby the throwing arm of the target trap is released. Thus the element of uncertainty and surprise is injected, so that neither the shooter nor attendant can know the exact moment when the target will be thrown. This make the invention particularly applicable for that type of shooting sometimes known as "skeet" shooting, wherein the conditions more nearly resemble those found in the field while hunting. In other words—according to my invention after the signal is given a manual switch is closed and then, after the lapse of a variable interval, the closing of the circuit is completed, the latch for the throwing arm is released and the target is projected.

In the drawing I have illustrated more or less conventionally a common type of target trap, merely as a basis for the complete understanding of the application and use of my control mechanism. It is to be understood, however, that any suitable type of trap target may be employed and that in some instances the control mechanism will vary slightly, in construction or in the method of engagement with the latch for the throwing arm, from the construction and arrangement herein shown and about to be described.

The target trap device here shown involves a base member 10 which may be mounted on a suitable support such as a platform 12. On the base 10 is a standard 14 which may be swung through an arc on a vertical axis and at the upper end of the standard is a frame 16 which may be adjusted on a horizontal axis.

The throwing arm is indicated by the numeral 18 and it is pivoted to the frame 16 at the point 20. A coil spring 22 is fixed to one end of the throwing arm 18 and at the opposite end has an adjustable connection 24 with the frame, said spring being employed for forcibly moving the throwing arm through an arc when it is released. At the free end of the throwing arm is a suitable chuck, not shown in detail, employed for holding a clay pigeon or target 26 which is projected when the throwing arm is released.

A portion of my control mechanism is housed in a control box 28 which may be mounted on the platform 12 adjacent the target trap. Within the control box 28 is a small motor 30 of any suitable type. This motor may be an electric motor supplied with current through conductors 32 and 34 from a suitable source of supply.

Fixed to the motor shaft is a pinion 36 which meshes with a speed reducing gear 38 fixed to a shaft 40. A commutator disc 42 of fiber or other suitable insulating material is likewise fixed to the shaft 40 and said disc is formed at one side with a marginal opening or notch 44.

A pair of spring contact arms 46 and 48 are mounted on opposite sides of the commutator disc 42 and through the greater portion of the revolution of said disc the contact arms are held apart by said disc. However, when the marginal notch 44 reaches the location of the contact arms, during the rotation of the disc, said contact arms are permitted to engage each other to cause the closing of a circuit.

The contact arms 46 and 48 are fixed to and carried by a suitable support such as a fiber block 50. The contact arms 46 and 48 are included in a control circuit by means of conductor wires 52 and 54, one of which, as here shown, is connected to one of the main current supply wires such as 32.

The control circuit also includes a magnet which is employed for releasing the latch which holds the throwing arm 18 in set position. The releasing magnet may be mounted in a housing or other suitable support such as 56 and as here shown this support may be mounted on the frame 16 of the target trap immediately below the throwing arm. The housing 56 may be made of any suitable material and if metallic preferably is provided with an insulated lining 58. (See Figure 2.)

The releasing magnet includes a suitable core 60, preferably of horseshoe form, with which is employed a copper wire winding indicated at 62. One end of the coil 62 is connected to one of the circuit wires such as 52 and the other end is connected to another circuit wire here designated by the numeral 64.

In connection with the core 60, which preferably is provided with brass contact points 66, there is employed an armature bar 68. As here shown the bar 68 is supported by a stem 70 having a pivotal connection thereto at the point 72. The stem 70 is attached to a latching pin or latching lug 74 and the members 70 and 74 are slidably mounted in a removable cover member 76 for the magnet housing 56.

The latching pin 74 is urged outwardly by a coil spring 78 placed in a recess in the cover member 76. The latching member 74 is adapted to have a suitable engagement with the throwing arm 18 for holding the latter member in set position. The armature bar 68 is normally spaced from the contact points of the core 60 of the releasing magnet and is held in such position by the action of the spring 78 upon the latching member. However, when the magnet is energized by closing the control circuit, the armature bar 68 is attracted toward the contact points of the core, thus drawing the stem 70 and latching member 74 inwardly against the urge of the spring 78. This serves to release the latching member from its engagement with the throwing arm 18, thereby permitting the target trap to operate for projecting a target such as 26.

Inasmuch as skeet shooting usually involves the use of target traps arranged in pairs for the individual participants, I have shown the control arrangement as adapted for the operation of either or both of the target traps of a pair. The control arrangement is illustrated diagrammatically in Figure 5 and it will be understood that certain of the features and particularly the releasing magnets and parts connected therewith will be duplicated so that there is one for each of the target traps of the pair. However, a single motor and a single set of spaced contact members 46 and 48 may be employed for controlling the circuit through both of the magnets. This control circuit preferably includes a pair of relays designated respectively by the characters A and B, one relay being associated with each of the releasing magnets so that a heavy current load may be applied when the circuit is closed, for causing a positive and sure action in the releasing of the throwing arm of the target trap. The conductor wire 64 of each releasing magnet is connected with one of the relays A or B.

In skeet shooting with a pair of target traps, sometimes one trap of the pair will be used and sometimes the other and at certain times both will be released simultaneously. I have therefore employed manual controls for selectively performing these three different releasing operations.

In the control circuit there is therefore placed a manual switch 80 which controls the circuit through a conductor 82 to the relay A and also a manual switch 84 which controls the circuit through a conductor 86 to the relay B, whereby the circuit through either one of the other of the relays may be completed selectively by closing the appropriate switch 80 or 84.

The relays A and B are suitably connected by bridge wires 88 and 90 and there is employed a third manual switch 92 of the two blade type which is connected with both of the conductors 82 and 86 whereby both relays A and B are energized upon the closing of the switch 92.

In the operation of the mechanism it will be understood that the motor 30 runs constantly, thereby turning the commutator disc 42 through the gearing 36—38. The contact arms 46 and 48 will be permitted to engage each other once during each revolution of the disc 42, which preferably is arranged so as to perform twenty revolutions per minute so that a contact of the arms 46 and 48 takes place once in three seconds. However, this periodic contact of the arms 46 and 48 has no effect upon the traps unless the circuit is first closed by throwing one of the manual switches 80, 84 or 92.

The shooter takes his station and when the signal is given, the traps first having been loaded and set, the attendant will manually close one or the other of the single switches 80 and 84 or the double switch 92, thereby placing one of the circuits in condition to be closed by engagement of the contact arms 46 and 48. The final closing of the circuit through engagement of these contact arms will of course be delayed for a variable time after the closing of one of the manual switches, the period of time depending upon the position of the disc 42 at the time. In other words, the complete closing of the circuit will occur at any time up to three seconds after the closing of the manual switch and will take place when the marginal notch 44 of the commutator disc reaches the location of the contact arms 46 and 48.

When this point is reached the circuit is closed through one of the releasing magnets, thereby attracting the armature bar 68 and withdrawing the latch member 74 to permit operation of the throwing arm 18 and release of the target.

When the double switch 92 is operated the circuit through both relays A and B and both releasing magnets will be completed and targets will be projected from both of the traps of the pair, thus giving opportunity for double shooting.

It will be understood not only that this control mechanism may be employed for target traps of various kinds but also that it may be arranged for single as well as for double shooting or in other words, is readily applicable to one instead of a pair of target traps.

The control mechanism is capable of being readily attached to a target trap which is already constructed or in use.

Other changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A control mechanism for a target trap having a latching member for its throwing arm, comprising an insulating disc formed with an opening at one point, means for rotating said disc, a pair of contact arms normally separated by said disc but adapted for engagement through said opening at a certain point in the rotation of the disc, a control circuit in which said contact arms are included, a manual switch for said circuit, a magnet in said circuit adapted to be energized by closing of the circuit by said contact arms after the manual switch has been closed, said magnet including an armature bar having connections with the latching member of the trap for releasing the throwing mechanism when the armature is attracted.

2. A control mechanism for a target trap having a latching member for its throwing arm, comprising an insulating disc formed with an opening at one point, means for rotating said disc, a pair of contact arms normally separated by said disc but adapted for engagement through said opening at a certain point in the rotation of the disc, a control circuit in which said contact arms are included, a manual switch for said circuit, a relay device in said circuit, a magnet in said circuit adapted to be energized by closing of the circuit by said contact arms after the manual switch has been closed, said magnet including an armature bar having connections with the latching member of the trap for releasing the throwing mechanism when the armature is attracted.

3. A control mechanism for a target trap having a latching member for its throwing arm, comprising a motor, a commutator disc of insulating material, gear connections between the motor and disc for rotating the latter, a pair of contact arms, one on each side of the disc and resiliently urged toward the same, said disc being formed with an opening therethrough permitting mutual engagement of said contact arms at one point in the rotation of the disc, a control circuit in which said contact arms are included, a manual switch for controlling said circuit, a magnet adapted to be energized when the circuit is closed by engagement of the contact arms after closing of the manual switch, an armature bar adapted to be moved by the energization of the magnet, and connections between said armature bar and the latching member of the trap for releasing the throwing arm when the magnet is energized.

4. A control mechanism for target traps arranged in set and each having a latching member for its throwing arm, said mechanism comprising a commutator disc, spring contacts arranged on opposite sides of said disc and normally separated thereby, means for rotating said disc, said disc being formed with an opening therethrough permitting mutual engagement of the contacts at one point in its rotation, a control circuit including said contacts, a magnet associated with each of the traps in the set, a separate relay circuit for each magnet with a suitable relay device therein, an individual manual switch for each relay circuit, each magnet having a movable armature and connections between the armature and the latching member of the associated trap, whereby the trap is released when the circuit is completed through its magnet by engagement of said contacts after the appropriate manual switch has been closed.

5. A control mechanism for target traps arranged in sets and each having a latching member for its throwing arm, said mechanism comprising a commutator disc, spring contacts arranged on opposite sides of said disc and normally separated thereby, means for rotating said disc, said disc being formed with an opening therethrough permitting mutual engagement of the contacts at one point in its rotation, a control circuit including said contacts, a magnet associated with each of the traps in the set, a separate relay circuit for each magnet with a suitable relay device therein, an individual manual switch for each relay circuit, a plural manual switch connected with all the relay circuits, whereby any relay circuit may be energized by closing its individual switch or all may be energized simultaneously by closing the plural switch, each magnet having a movable armature, and connections between such armature and the latching member of the associated trap, whereby the traps are selectively released either singly or all in unison, whenever a circuit is completed through one or all of the magnets by engagement of said spring contacts after the appropriate manual switch has been closed.

FRANCIS J. NEMMERS.